(No Model.)
M. R. PEPPER.
GLASS FURNACE.
No. 512,321. Patented Jan. 9, 1894.
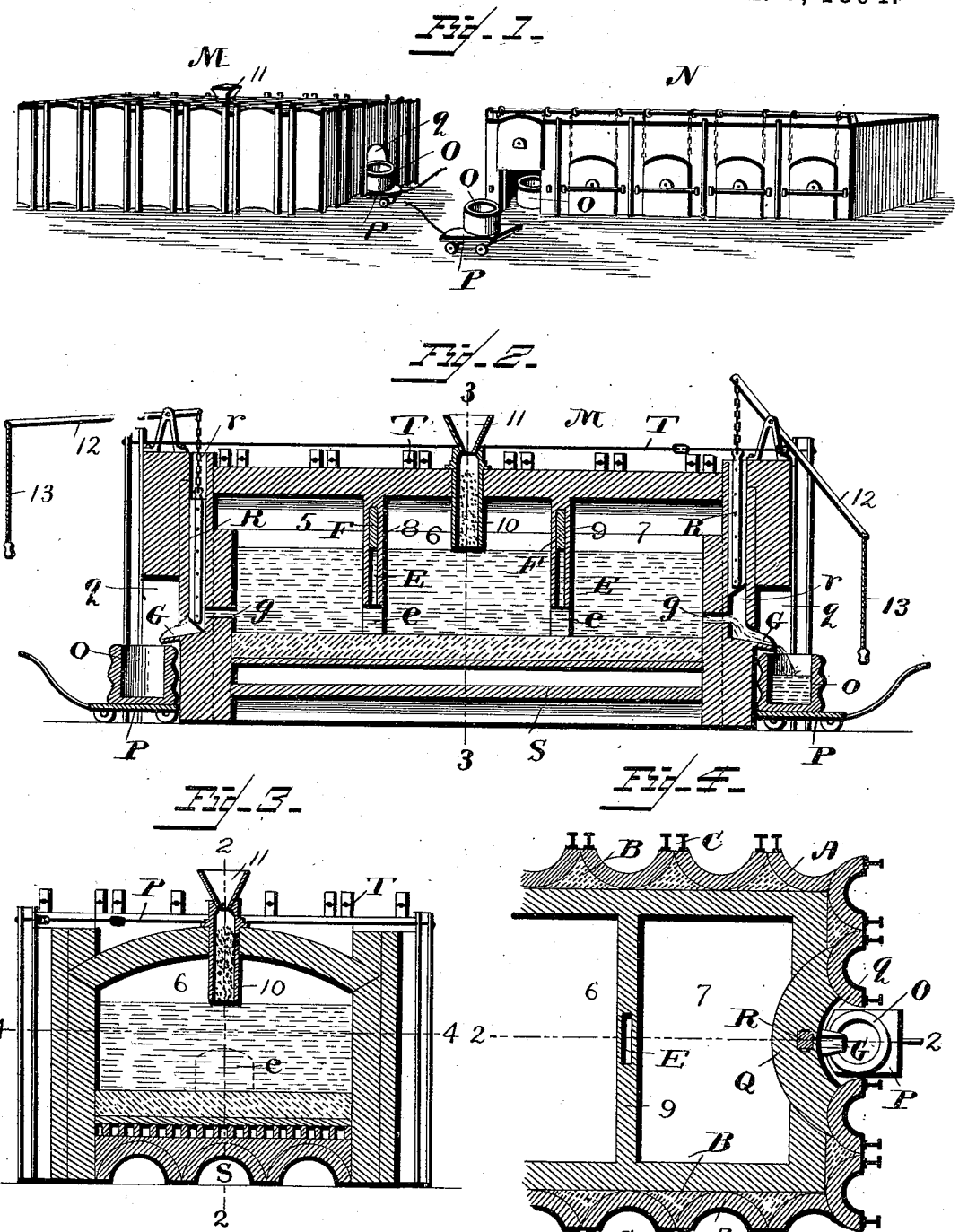

UNITED STATES PATENT OFFICE.

MATTHIAS RANDOLPH PEPPER, OF FORD CITY, PENNSYLVANIA.

GLASS-FURNACE.

SPECIFICATION forming part of Letters Patent No. 512,321, dated January 9, 1894.

Application filed December 6, 1892. Serial No. 454,223. (No model.)

*To all whom it may concern:*

Be it known that I, MATTHIAS RANDOLPH PEPPER, a citizen of the United States, residing at Ford City, in the county of Armstrong and State of Pennsylvania, have invented certain new and useful Improvements in Glass-Furnaces; and I do hereby declare the following to be a full, clear, and exact description of the invention, such as will enable others skilled in the art to which it appertains to make and use the same.

This invention relates to an apparatus for refining glass prior to working the same, whereby a saving of labor, fuel, and material is effected, thereby lessening the cost of production in an appreciable degree.

The invention consists of the novel features and the peculiar construction and combination of the parts which will be hereinafter more fully described and claimed and which are shown in the annexed drawings, in which—

Figure 1 is a perspective view of the apparatus for carrying the invention into successful operation. Fig. 2 is a vertical central sectional view of the tank on the line 2—2 of Figs. 3 and 4. Fig. 3 is a cross section on the line 3—3 of Fig. 2. Fig. 4 is a plan section of one end of the tank on the line 4—4 of Fig. 3.

The apparatus consists essentially of a tank M and a refining furnace N. This tank and furnace may be of any approved form of construction suitable for the purpose and are preferably arranged close together to avoid moving the pots laden with the molten glass a long distance. The pots O are of usual make and are transferred on trucks P from the tank to the furnace.

The tank M found to give the best results is shown in detail in Figs. 2, 3 and 4 and admits of the process being continuous, because the batch or glass making material is continuously fed to the tank and may be drawn therefrom as required. This tank is divided into compartments 5, 6 and 7, by the partitions 8 and 9. The midde compartment 6 is provided with a magazine 10 which extends into the tank some distance and which holds the batch or glass forming material until the same is reduced. The batch is fed to the magazine 10 by means of the hopper 11. The partitions 8 and 9 each have openings $e$ at their lower ends and pockets E projecting upward from the said openings. The several compartments have communication with each other through the openings $e$. A float F located in each pocket E is adapted to close or partially close opening $e$ to prevent the batch or glass forming material entering either of the compartments 5 and 7. This float rises and falls with the level of the molten glass. The end walls of the tank have semicircular portions Q which have a recess $q$ into which the pot O is run to receive the molten glass. The spout G communicates with opening $g$ through which the molten glass escapes into the pot. The gate R works in an opening $r$ and closes the opening $g$ and is operated by means of lever 12 to the inner end of which it is connected. The outer end of the lever has a pull 13 attached thereto for convenience in operating the lever to open and close the gate.

S represents the furnace by means of which the tank is heated. Obviously, the heat may be obtained from natural gas by any of the well known appliances.

The tank is strengthened by buttresses which comprise arch or semi cylindrical pieces A, wall of masonry B and iron beams C C suitably tied together by rods T.

Having thus described my invention, what I claim, and desire to secure by Letters Patent, is—

1. The herein described tank for melting glass having a semi circular portion provided with a depression Q, recess $q$, and having opening $g$, spout G, and opening $r$, a gate for closing opening $g$ working in opening $r$, and a lever for actuating the said gate, substantially as specified.

2. A tank for melting glass having compartments formed by a partition which is provided with opening $e$ and pocket E, float F in the said pocket adapted to rise and fall with the level of the glass, and a magazine in one of the compartments for receiving the batch, substantially as described.

3. A tank having partitions 8 and 9 provided with openings *e* and pockets E and having semi circular end portions which are provided with depression Q, recess *q*, spout G and openings *r* and *g*, gates R for closing the openings *g* and connected with operating levers, floats in the pockets E, and a magazine 10 in the middle compartment, substantially as and for the purpose described.

In testimony whereof I affix my signature in presence of two witnesses.

MATTHIAS RANDOLPH PEPPER.

Witnesses:
 JOHN WAYMUN,
 JAS. D. NESBITT.